(12) United States Patent
Pezzoli

(10) Patent No.: US 9,266,149 B2
(45) Date of Patent: Feb. 23, 2016

(54) METHOD AND SYSTEM FOR EXPELLING FOOD PRODUCTS IN CONTROL AND SELECTION APPARATUSES

(71) Applicant: RAYTEC VISION S.P.A., Parma (PR) (IT)

(72) Inventor: Raffaele Pezzoli, Parma (IT)

(73) Assignee: RAYTEC VISION S.P.A., Parma (PR) (IT)

( * ) Notice: Subject to any disclaimer, the term of this patent is extended or adjusted under 35 U.S.C. 154(b) by 0 days.

(21) Appl. No.: 14/572,901

(22) Filed: Dec. 17, 2014

(65) Prior Publication Data

US 2015/0165485 A1 Jun. 18, 2015

(30) Foreign Application Priority Data

Dec. 18, 2013 (IT) .............................. PR2013A0102

(51) Int. Cl.
*B07C 5/00* (2006.01)
*B07C 5/36* (2006.01)

(52) U.S. Cl.
CPC ................. *B07C 5/365* (2013.01); *B07C 5/367* (2013.01); *B07C 2501/0081* (2013.01)

(58) Field of Classification Search
CPC ................................... B07C 5/36; B07C 5/363
USPC .................................................. 209/643, 552
See application file for complete search history.

(56) References Cited

U.S. PATENT DOCUMENTS

| | | | | |
|---|---|---|---|---|
| 1,994,000 A * | 3/1935 | Lang | ....................... | F02N 1/005 123/274 |
| 2,131,779 A * | 10/1938 | Deckel | ................... | F02M 59/02 137/540 |
| 2,192,289 A * | 3/1940 | Eagle | ...................... | F02N 11/08 123/179.3 |
| 2,889,045 A * | 6/1959 | Turpin | ...................... | B03B 5/24 209/455 |
| 5,242,059 A * | 9/1993 | Low | ....................... | B07C 5/362 198/370.12 |
| 6,499,632 B2 * | 12/2002 | van't Hoff | ............. | B65D 83/64 222/389 |

* cited by examiner

*Primary Examiner* — Terrell Matthews
(74) *Attorney, Agent, or Firm* — Young & Thompson

(57) ABSTRACT

Vacuum system for collecting food products, the food products moving on one conveyor element, and the collection system executed by vacuum suction of at least one suction duct which transversely intercepts the conveyor element and bears a plurality of holes directed towards the conveyor belt, and elements for controlling the opening or closing of the holes. The suction duct acts as a shutter-valve, i.e. as a suction element, the stems of the cylinders are adapted to directly interfere, that is close or open, the corresponding passage hole on the suction duct. The stems of the cylinders pass inside the suction duct.

5 Claims, 2 Drawing Sheets

METHOD AND SYSTEM FOR EXPELLING FOOD PRODUCTS IN CONTROL AND SELECTION APPARATUSES

FIELD OF THE INVENTION

The present invention refers to the field of control and selection systems for food products with high content of water/juice.

Precisely, it concerns an expulsion process, i.e. discard by suction.

BACKGROUND OF THE INVENTION

In the domain of automatic selection of food products, the technique of discarding the defects is known according to three different principles, which can be summarized as:

Expulsion by air jet.
Mechanic expulsion with pneumatic control.
Expulsion by suction tubes.

Of course each of these solutions is well suited to particular products and related defects, in order to obtain the maximum discarding efficiency with the minimum value of false discard.

The finding here described and claimed, concerns products with high content of water/juice, which therefore must be discarded via suction.

The known technology requires distributing the product on a carpet, if possible in a single layer (for cubes) or in a layer of adequate thickness in the case of pulps.

These expulsion systems and groups are applied downstream of the so-called selection machines which, by means of a suitable optic-electronic part, actually control the discarding group.

For simplicity purposes, the electronic selector is composed of video cameras which frame the product passing on the carpet, the product being illuminated by a light group with specific wavelengths.

The collected signals are elaborated by a vision board, which—based on the comparison with pre-settable threshold parameters—activates the expulsion group in the area where the defect is passing.

The suction expulsion group is composed of a central collector tube, of varying size, which laterally bears a certain amount of suction ports, usually positioned in two rows, in quincunx position as shown in FIG. 1 of the known art.

A cylinder or an electric actuator controls a shaft which at its end bears a bushing/valve which, by sliding vertically, connects the central manifold (where the vacuum is applied) to a suction port. In idle position, the valve or bushing closes the communication hole, whereas it opens it when in suction position.

The product is spread and distributed at a certain distance from the resting bushing; the bushing descends approaching the carpet and opening the communication port.

At this point there are drawbacks, related to the fact that suction already begins when the bushing/valve starts to open the communication duct (passing in front of the hole of its suction manifold): in a time diagram regarding the suction action in the carpet area, there is shown that at first there's no depression (duct completely closed), then while the duct is being opened along the descending path of the valve/bushing, it can be observed that the suction action on the carpet area begins.

Therefore there is a depression curve that reaches its maximum at the complete opening (and stays like that for a definite time), then returns to zero symmetrically; this leads to suction phenomena adapted to create turbulences already during the bushing descending step; it follows that, being the bushings adjacent one to the other, they can interfere one another in their operating step, or at least the operating actuator can modify the position of the adjacent defects or even move the product, in case the latter is light. Moreover, the quantity of sucked material exceeds the desired amount, since the step starts before the supposed time.

SUMMARY OF THE INVENTION

The object of the present invention is to solve the aforesaid drawbacks, providing the technology with a product expulsion-collection method and system for food products control and selection apparatuses.

Another object is to avoid moving any suction system using opening and closing valves, i.e. allowing the cylinder to directly serve as a shutter, without being connected to a suction system.

Another object of the invention is to simplify the system using only one manifold without an external jacket and relative bushing/valve.

To this regard, another embodiment provides for positioning the manifold holes on the bottom instead of the sides, i.e. obtained on the cylinder mantle and positioned in parallel facing the underlying carpet.

Therefore another object is to provide for the cylinder being part of the suction device.

Finally, another object is to position the manifold near the carpet where the product passes through already in idle position, and with the related holes, as said above, obtained on the mantle of the manifold itself, such that the inside of the manifold is directly communicating with the product.

As stated above, the holes are kept closed, or obstructed, by the corresponding cylinder end, such that, when the cylinder opens the related hole, the opening step occurs almost instantly and the opening curve is much steeper compared to the aforementioned one; the same occurs in the closing step.

In other words the suction selection process becomes almost instantaneous.

Because of the almost instantaneous opening by the cylinder itself, the product selection action is aimed in the immediate surrounding of the area to be collected, thus increasing the selection precision.

Another advantage is that the hole of the corresponding cylinder has a much shorter stroke while opening and closing, so that there is an increased execution speed, this contributing to reduce the collection of good product in the defect.

Finally the apparatus construction simplification must be highlighted, with a corresponding encumbrance reduction because of the only presence of cylinders that operate as shutters.

Such objects and advantages are all achieved by the expulsion method and system in food products control and selection apparatuses, subject of the present invention, characterized as provided in the subsequent claims.

BRIEF DESCRIPTION OF THE DRAWINGS

This and other characteristics will be more apparent by the following description of some illustrated embodiments, provided by way of non-limiting example, in the appended figures.

DESCRIPTION OF THE PRIOR ART

Figure 1:
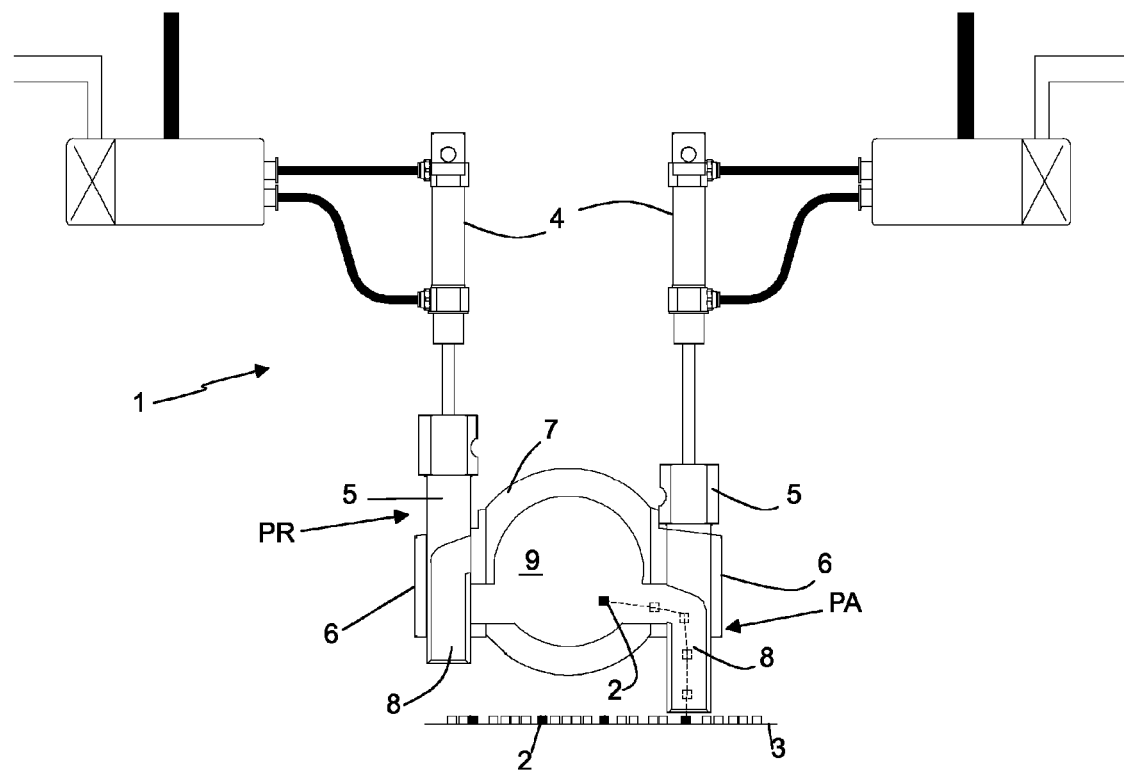
FIG. 1: shows the suction/expulsion system known art in a selector machine.

Particularly referring to FIG. 1, there is shown how the suction of product 2 selected as defective occurs nowadays, the product, more or less thick, being spread and in transit on a carpet 3 or transport means.

First of all, it must be said that there is an image processing system upstream (not shown and not part of the finding), adapted to detect defects in the product moved by a transport means; following the detection of one or more defects, the processing system interacts with at least one expulsion system 1, controlling the opening of corresponding cylinders 4 bearing two ways valves 5, sliding in corresponding jackets 6 integrally arranged and aside a unique suction manifold or duct 7.

Obviously only the affected valves 5 are controlled, under which product 2 with the defect to be removed passes.

Valves 5 are bushings bearing a passage duct 8 for the communication with the manifold 7; in this way jackets 6 and the related valves 5 serve as sucking ports: by controlling the height of the valve, the bushing passage duct 8 can be put in communication with the manifold and thus the sucking port.

The valve 5 or bushing is linked to the pneumatic cylinder 4; the pneumatic cylinder 4 moves the valve 5 (weighting several hectograms) from the idle position PR to the opening position PA corresponding to the suction position.

The cylinder has a quite long stem 4B, usually more than 25 centimeters long, a diameter of no less than 16 millimeters and a stroke comprised between 30 and 50 millimeters.

The suction discarding principle has a series of limitations which limit its application to the selection of products with high content of liquids, but which are in pieces (e.g. cubed tomatoes), In particular the technical limitations are:
Mid-low suction velocity and repetitiveness, caused by the cylinder 4 stroke, the bore thereof and the weight to be moved;
Collection efficiency loss, unless the suction tube is maintained active, which in turn leads to a substantial increase in good product in the discard;
Limits in the number of suction ports that can be simultaneously activated, being the vacuum volume finite and with a too slow recovery time;
Limits in the suction port size and passing section from the carpet to the manifold of several centimeters.

DETAILED DESCRIPTION OF THE INVENTION

Figure 2:
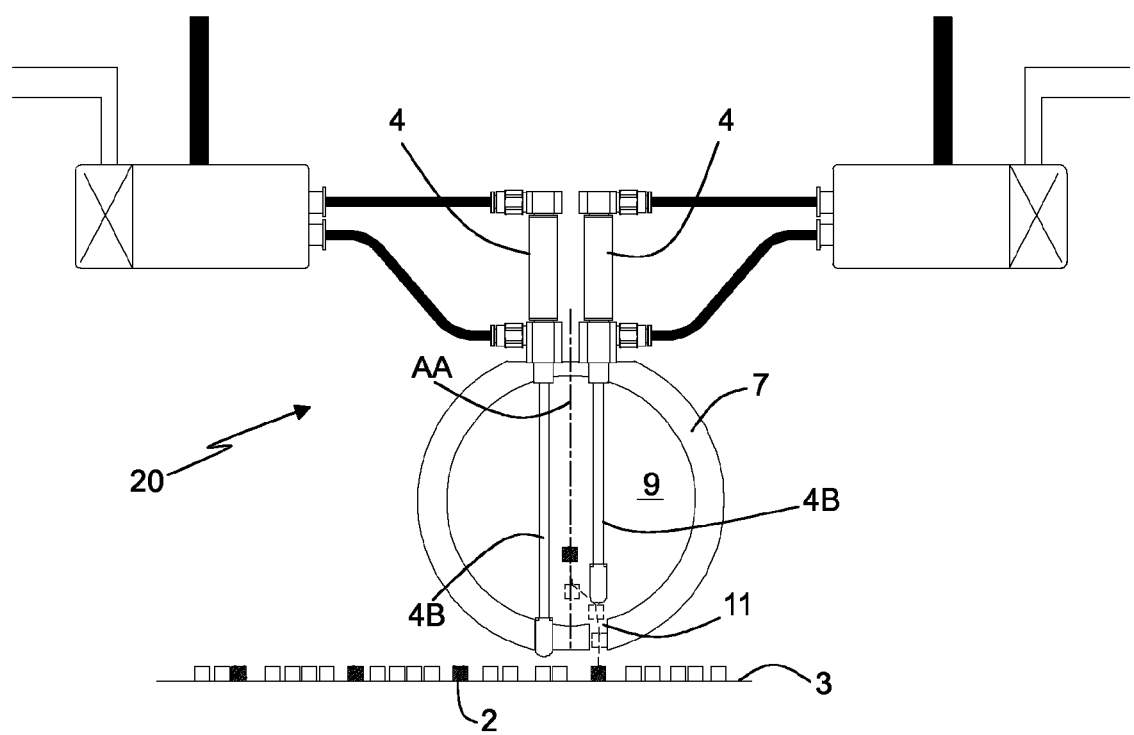
FIG. 2: shows the system subject of the finding for the product selection to be used in the field of product expulsion machines and plants.

Particularly referring to FIG. 2, the expulsion system subject of the invention is shown, being adapted to perform a particular expulsion thus solving all the existing and known system weak points.

A vacuum system 20 is provided for expelling food products 2, said food products moving on at least one conveyor means 3 and said collection system executed by means of vacuum suction of at least one suction duct 7 which transversely intercepts the conveyor means and bears a plurality of holes 11 directed towards the conveyor means 3, and cylinders 4 for controlling the opening or closing of the holes 11.

System 20 is conceived such that cylinder 4 itself serves as a shutter-valve. As a matter of fact, stem 4B of cylinder 4 directly closes the corresponding passage hole 11, bored directly through the suction manifold 7 mantle, said hole defining an opening on the cylinder for the communication outside and thus for the suction creation.

This entails improvements in performance, efficiency and consumption.

Differing from the known art, the system removes jacket 6, bushings 5 and corresponding suction ports 8. This allows for remarkable space economy, the stems 4B of the cylinders 4 passing inside the suction manifold and the stem 4B of the cylinder being the shutter of the holes 11, this allowing to reduce the diameter of the suction hole up to 8 millimeters, for example.

Moreover it can be observed that the suction duct holes 11 are arranged in proximity to the axis AA of the cross section thereof.

Among the advantages of the described and claimed system the following are highlighted:
Suction area is reduced to only 0.5 cm² in section with considerable benefits in terms of reducing good product in the discard.
Reduction in the cylinder stroke, thus increasing velocity.
Increased repetitiveness in time.
Reduction in vacuum consumption.
Not being the suction duct in movement, but directly positioned near the product to be selected, it is much more efficient in the collection.
The discarded product path is much shorter, a few millimeters, thus eliminating the risk of it falling back in the good product.
The system is linear and compact, for an easier external cleaning.

The invention claimed is:

1. A vacuum system (20) for expelling food products (2), comprising:
at least one conveyor means (3) that moves said food products thereon; and
a collection system comprised of
i) at least one suction duct (7) which transversely intercepts an elongation direction of the conveyor means, the suction duct (7) having and interior region a plurality of passage holes (11) directed towards the conveyor means (3), the passage holes (11) opening the interior region of the suction duct (7) to an exterior of the suction duct (7) to thereby allow said food moved on the conveyor means (3) to be collected into the interior region of the suction duct (7), and
ii) cylinders (4) for controlling opening and closing of the passage holes (11),
each cylinder (4) having a stem (4B) that
a) directly moves into a corresponding one of the passage holes (11) to close and shutter the corresponding one passage hole (11), and
b) moves out of the corresponding one passage hole (11) to open the corresponding one passage hole (11),
wherein each cylinder (4) acts as a shutter-valve controlling the stem (4B) of the cylinder to directly close and open the corresponding one passage hole (11) by moving into and out of the corresponding one passage hole (11).

2. A vacuum system according to claim 1, wherein the stems (4B) of the cylinders pass inside (9) the suction duct (7) into the interior region of the suction duct (7).

3. A vacuum system according to claim 1, wherein the stems (4B) of the cylinders include a terminal end part that are shutters of the holes (11).

4. A vacuum system according to claim 1, wherein the holes (11) are arranged along a wall surface of the duct (7), in proximity to the axis (AA) of the cross section of the duct (7).

5. A plant for expelling food products with high water/juice content, or discarding via suction, comprising at least one system according to claim 1.

* * * * *